(12) United States Patent
Sun et al.

(10) Patent No.: US 10,909,002 B2
(45) Date of Patent: Feb. 2, 2021

(54) FAULT TOLERANCE METHOD AND SYSTEM FOR VIRTUAL MACHINE GROUP

(71) Applicant: Industrial Technology Research Institute, Hsinchu (TW)

(72) Inventors: Yi-Feng Sun, Sunnyvale, CA (US); Tzi-Cker Chiueh, Taipei (TW); Po-Jui Tsao, Taipei (TW); Hsuan-Heng Wu, Taipei (TW); Chuan-Yu Cho, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 259 days.

(21) Appl. No.: 16/022,734

(22) Filed: Jun. 29, 2018

(65) Prior Publication Data

US 2020/0004642 A1   Jan. 2, 2020

(51) Int. Cl.
 *G06F 11/14* (2006.01)
 *G06F 11/20* (2006.01)
 (Continued)

(52) U.S. Cl.
 CPC ...... *G06F 11/1464* (2013.01); *G06F 9/45558* (2013.01); *G06F 11/1484* (2013.01);
 (Continued)

(58) Field of Classification Search
 None
 See application file for complete search history.

(56) References Cited

U.S. PATENT DOCUMENTS 8,983,961 B2   3/2015 Chan et al.
9,015,164 B2   4/2015 Chan et al.
(Continued)

FOREIGN PATENT DOCUMENTS

CN   102521063   12/2013
CN   105607962   5/2016
(Continued)

OTHER PUBLICATIONS

"Office Action of Taiwan Counterpart Application", dated Apr. 30, 2019, p. 1-p. 3.
(Continued)

*Primary Examiner* — Lewis A Bullock, Jr.
*Assistant Examiner* — Melissa A Headly
(74) *Attorney, Agent, or Firm* — JCIPRNET (57) ABSTRACT

A fault tolerance method and system for a virtual machine group is proposed. The method includes: establishing fault tolerance backup connections of virtual machines between a virtual machine hypervisor of at least one primary host and a virtual machine hypervisor of at least one backup host to perform fault tolerance backups of the virtual machines, wherein the plurality of virtual machines are included in a fault tolerance group; when a synchronizer determines that a failover of at least one first virtual machine among the primary virtual machines in the fault tolerance group is being performed. Informing, by the synchronizer, to perform a failover of other remaining primary virtual machines among the primary virtual machines in the fault tolerance group, or to return other remaining primary virtual machines among the primary virtual machines in the fault tolerance group back to a last fault tolerance backup state of each and continue performing fault tolerance backups of the other remaining primary virtual machines.

14 Claims, 8 Drawing Sheets

(51) Int. Cl.
*G06F 9/455* (2018.01)
*G06F 11/16* (2006.01)

(52) U.S. Cl.
CPC ...... *G06F 11/1658* (2013.01); *G06F 11/2023* (2013.01); *G06F 11/2097* (2013.01); *G06F 2009/4557* (2013.01); *G06F 2201/815* (2013.01); *G06F 2201/84* (2013.01)

(56) References Cited

U.S. PATENT DOCUMENTS

| | | | |
|---|---|---|---|
| 9,645,811 | B2 | 5/2017 | Carlen et al. |
| 9,952,932 | B2 | 4/2018 | Helleren |
| 2010/0107158 | A1 | 4/2010 | Chen et al. |
| 2011/0208908 | A1* | 8/2011 | Chou ............... G06F 11/1662 711/112 |
| 2013/0290781 | A1 | 10/2013 | Chen et al. |
| 2013/0290782 | A1 | 10/2013 | Chen et al. |
| 2014/0149354 | A1 | 5/2014 | Chan et al. |
| 2016/0337480 | A1* | 11/2016 | Anerousis ........... G06F 9/45558 |
| 2019/0182207 | A1* | 6/2019 | Tsirkin ............... G06F 9/45558 |

FOREIGN PATENT DOCUMENTS

| | | |
|---|---|---|
| CN | 106970861 | 7/2017 |
| TW | I592796 | 7/2017 |

OTHER PUBLICATIONS

Cully B, et al., "Remus: High Availability via Asynchronous Virtual Machine Replication," 5th USENIX Symposium on Networked Systems Design and Implementation, Apr. 2008, pp. 161-174.

Maohua Lu, et al., "Fast Memory State Synchronization for Virtualization-based Fault Tolerance," IEEE/IFIP International conference on dependable systems & Networks, Jun. 29-Jul. 2, 2009, pp. 534-543.

Kai-Yuan Hou, et al., "HydraVM: Low-Cost, Transparent High Availability for Virtual Machines," HP Laboratories, Feb. 21, 2011, pp. 1-13.

Yoshiaki Tamura, et al., "Kemari: Virtual Machine Synchronization for Fault Tolerance," NTT Cyber Space Laboratories; NTT Corporation, Jun. 2008, pp. 1-2.

Kai Li, et al., "Low-latency, concurrent checkpointing for parallel programs," IEEE Transactions on Parallel and Distributed Systems, vol. 5, Aug. 1994, pp. 874-879.

* cited by examiner

FAULT TOLERANCE METHOD AND SYSTEM FOR VIRTUAL MACHINE GROUP

TECHNICAL FIELD

The disclosure relates to a fault tolerance technique for a virtual machine (VM) group.

BACKGROUND

A backup cycle, i.e. how often to backup the current system state, is one of core issues in a VM fault tolerance system since it may highly affect the efficiency of the backup and the performance of the system. However, in the existing VM fault tolerance systems, it would be difficult to control the delay of work demands, i.e. the response time of work demands. The reason behind is that a conventional backup approach is to compare and transmit a system difference to a backup end, and yet the backup data amount would not be consistently generated every time. Hence, the backup time would be hardly controlled, and the delay time of work demands would be thus hardly controlled.

Figure 1A:
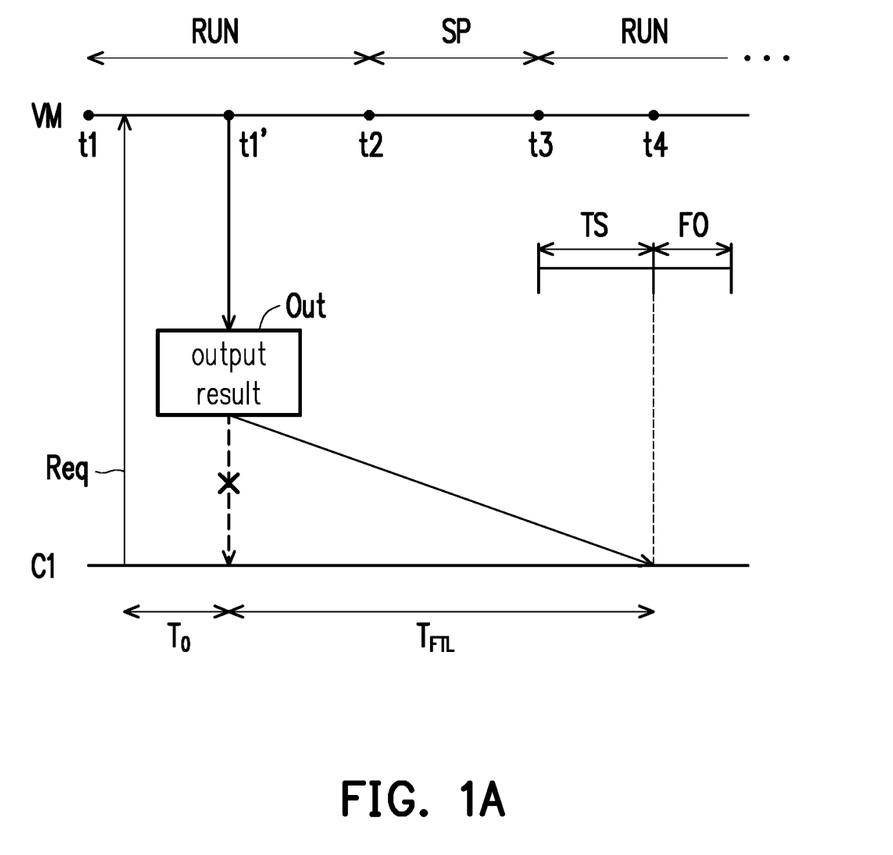
FIG. 1A is a schematic diagram of a backup process of a VM system with respect to a time axis.

To be specific, FIG. 1A is a schematic diagram of a backup process of a VM system with respect to a time axis. Referring to FIG. 1A, the backup of a VM may be divided into four stages: a run stage RUN, a snapshot stage SP, a transfer stage TS, and an output flush stage FO. Assume after the fault tolerance system has been started, a backup cycle would start at time T1. When the VM receives a workload demand Req at time t1' and generates an output result Out, the output result Out would be stored and would not be outputted until the output flush stage FO. Since the output result Out would not be outputted before the backup of the state of the VM completes, the response time of one demand would be $T_0$ and an extra delay time $T_{FTL}$.

Figure 1B:
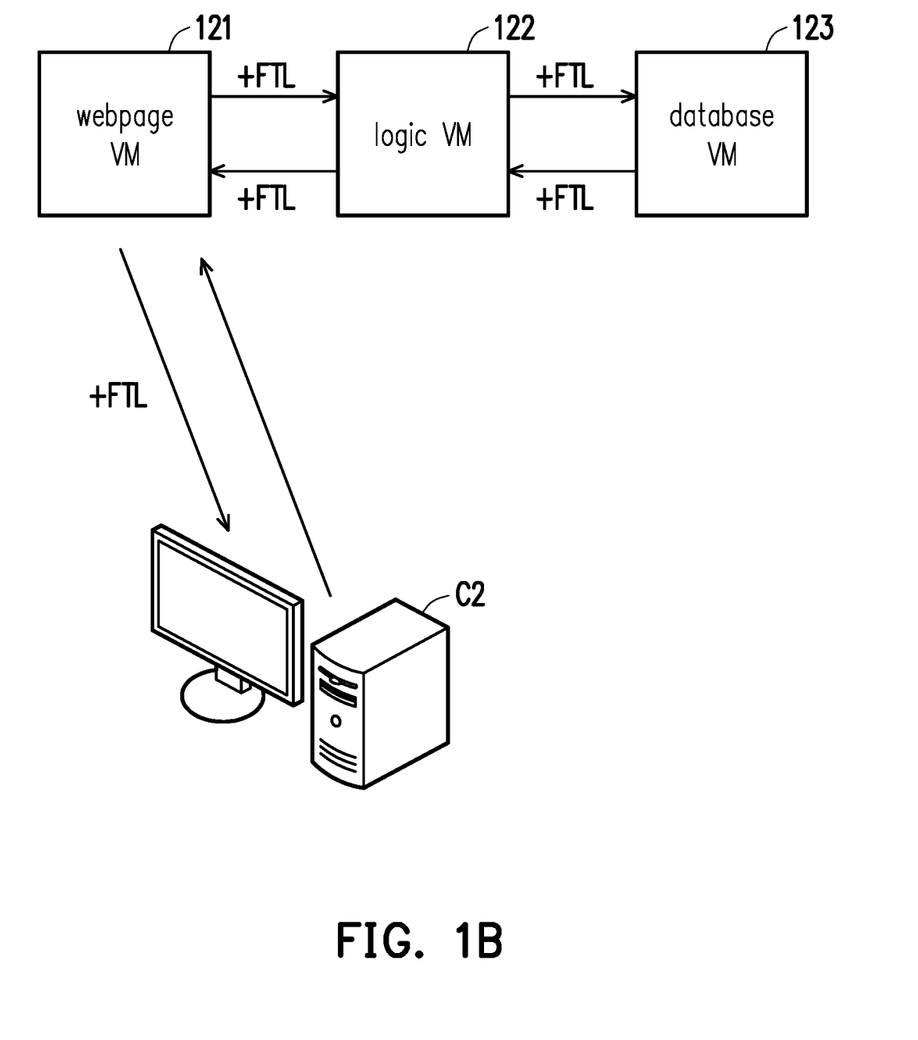
FIG. 1B illustrates a schematic diagram in accordance with a three-layer network architecture.

Moreover, in a network environment with a multi-layer architecture, an additional delay would be generated for each server node due to virtual fault tolerance, and the response time of one demand would be increased, and the response time would be even longer for more server nodes. Take a schematic diagram in accordance with a three-layer network architecture as illustrated in FIG. 1B as an example. There exist dataflows between clusters of a webpage VM 121, a logic VM 122, and a database VM 123. If the dataflows are not taken into account and each VM performs a fault tolerance at a different time, the response time of a demand from a client C2 would be too long, and in clusters of a three-layer network architecture, for example, additional five times of a fault tolerance backup delay time +FTL would be required. As such, for workload demands with high delay sensitivity such as real-time transaction or game servers, if there is no fault tolerance system that is able to control such delay, disconnection or transaction failure may easily occur due to the long delay.

SUMMARY OF THE DISCLOSURE

A fault tolerance method and a fault tolerance system for a group are provided in the disclosure.

According to one exemplary embodiment of the disclosure, the method includes: establishing fault tolerance backup connections of a plurality of primary virtual machines between a virtual machine hypervisor of at least one primary host and a virtual machine hypervisor of at least one backup host to perform fault tolerance backups of the primary virtual machines, wherein the plurality of primary virtual machines are included in a fault tolerance group. When a synchronizer determines that a failover of at least one first virtual machine among the primary virtual machines in the fault tolerance group is being performed, informing, by the synchronizer, to perform a failover of one or more other remaining primary virtual machines among the primary virtual machines in the fault tolerance group, or the synchronizer informing to return the other remaining primary virtual machines among the primary virtual machines in the fault tolerance group back to a last fault tolerance backup state of each and continue performing the fault tolerance backups of the other remaining primary virtual machines, wherein the fault tolerance system includes the at least one primary host, the at least one backup host, and the synchronizer, where the synchronizer is connected to the at least one primary host and the at least one backup host. Wherein the at least one primary host runs the primary virtual machines, the at least one backup host runs backup virtual machines, the primary virtual machines in the fault tolerance group correspond to the backup virtual machines when performing the fault tolerance backups.

According to one exemplary embodiment of the disclosure, the fault tolerance system includes at least one primary host, at least one backup host, and a synchronizer. The at least one primary host is configured to run multiple primary virtual machines, wherein the primary virtual machines are included in a fault tolerance group. The at least one backup host is configured to run multiple backup virtual machines, the primary virtual machines in the fault tolerance group correspond to the backup virtual machines when performing fault tolerance backups. The synchronizer is connected to the at least one host and the at least one backup host. When the synchronizer determines that a failover of at least one first virtual machine among the primary virtual machines in the fault tolerance group is being performed, the synchronizer informs to perform a failover of one or more other remaining primary virtual machines among the primary virtual machines in the fault tolerance group, or the synchronizer informs to return the other remaining primary virtual machines among the primary virtual machines in the fault tolerance group back to a last fault tolerance backup state of each and continue performing the fault tolerance backups of the other remaining primary virtual machines in the fault tolerance group. Wherein the virtual machine hypervisor of the at least one primary host respectively establishes fault tolerance backup connections of multiple virtual machines with the virtual machine hypervisor of the at least one backup host to perform the fault tolerance backups of the primary virtual machines.

In order to make the aforementioned features and advantages of the present disclosure comprehensible, preferred embodiments accompanied with figures are described in detail below.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts. Indeed, various embodiments of the invention may be embodied in many different forms and should not be construed as limited to the embodiments set forth herein; rather, these embodiments are provided so that this invention will satisfy applicable legal requirements.

Figure 1C:
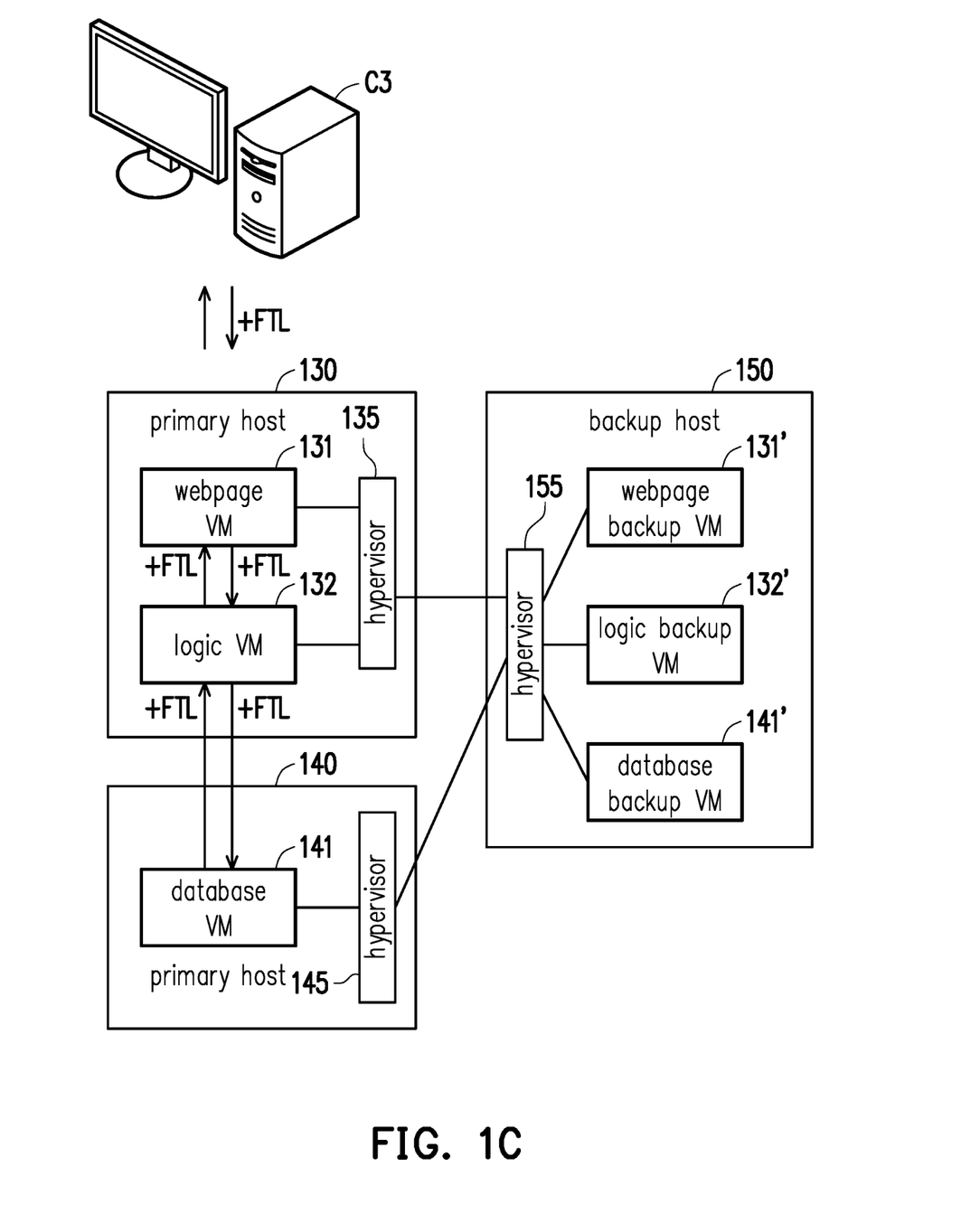
FIG. 1C illustrates a schematic diagram in accordance with a conventional VM system having a fault tolerance feature.

FIG. 1C illustrates a schematic diagram in accordance with a conventional VM system having a fault tolerance feature. In general, multiple primary VMs in a system may run on a same primary host or different primary hosts. Similarly, multiple backup VMs respectively corresponding to each of the primary VMs may run on a same backup host or different backup hosts. As illustrated in FIG. 1C, a VM system 100 would include a primary host 130, a primary host 140, and a backup host 150. The primary host 130 would include a virtual machine hypervisor 135 (also referred to as "a VM monitor"), the primary host 140 would include a virtual machine hypervisor 145, and the backup host 150 would include a virtual machine hypervisor 155. The primary host 130 would run multiple primary VMs such as a webpage VM 131 and a logic VM 132 in this example, and the primary host 140 would run a database VM 141. The backup host 150 would run multiple backup VMs corresponding to multiple primary VMs, such as a webpage backup VM 131', a logic backup VM 132' and a database backup VM 141' in this example.

When the primary VMs 130 and 140 operate normally and a fault tolerance feature is on, the virtual machine hypervisor 155 of the backup host 150 would start up a backup VM on the backup host 150, and the backup VM would wait for receiving signals. Meanwhile, the virtual machine hypervisors 135 and 145 on the primary hosts 130 and 140 would respectively establish connections with the virtual machine hypervisor 155 on the backup host 150 and transmit system states of their primary VMs to the virtual machine hypervisor 155 on the backup host 150. Once the virtual machine hypervisor 155 on the backup host 150 update the state of the backup VM to be in consistent with that of the primary VMs, fault tolerance connections have been established.

After the virtual machine hypervisors 135 and 145 on the primary host 130 and 140 record state changes of each primary VM between time T0-T1, the state changes would be transmitted to the virtual machine hypervisor 155 on the backup host 150 so as to update the states of a backup VM corresponding to each primary VM for fault tolerance backup. The backup VM would remain in a system pending state and wait for receiving signals. However, since dataflow between software in such VM system is not considered and the primary hosts 130 and 140 perform fault tolerance backups of their primary VMs at different times, the data response time on the demand of a client C3 may be too long due to multi-layer transmission.

In accordance with an exemplary embodiment of the disclosure, multiple primary VMs on the client would form at least one fault tolerance group, and the restriction on preserving the output result among the primary VMs in the fault tolerance group would be released so that all members within the same fault tolerance group would allow to transmit data with each other and thereby obviating long response time. In an exemplary embodiment, a synchronizer may record network card numbers of all primary VMs in a fault tolerance group. When the target of the output in the network corresponds to any network card number of the member in the fault tolerance group, the data may be transmitted before the output flush stage. Hence, a backup synchronizer would be introduced in a fault tolerance system in an exemplary embodiment of the disclosure to monitor and/or synchronize fault tolerance states in the fault tolerance system as well as to monitor synchronized snapshots, fault tolerance backup and/or failover of the primary VMs within a same group. Such synchronizer would transmit the network card numbers to each of the VMs in the fault tolerance group. A virtual machine hypervisor of the primary hosts determines that an object to which the output result is transmitted corresponds to one of the network card number, it would control the output result to be outputted before the output flush out stage.

Figure 2:
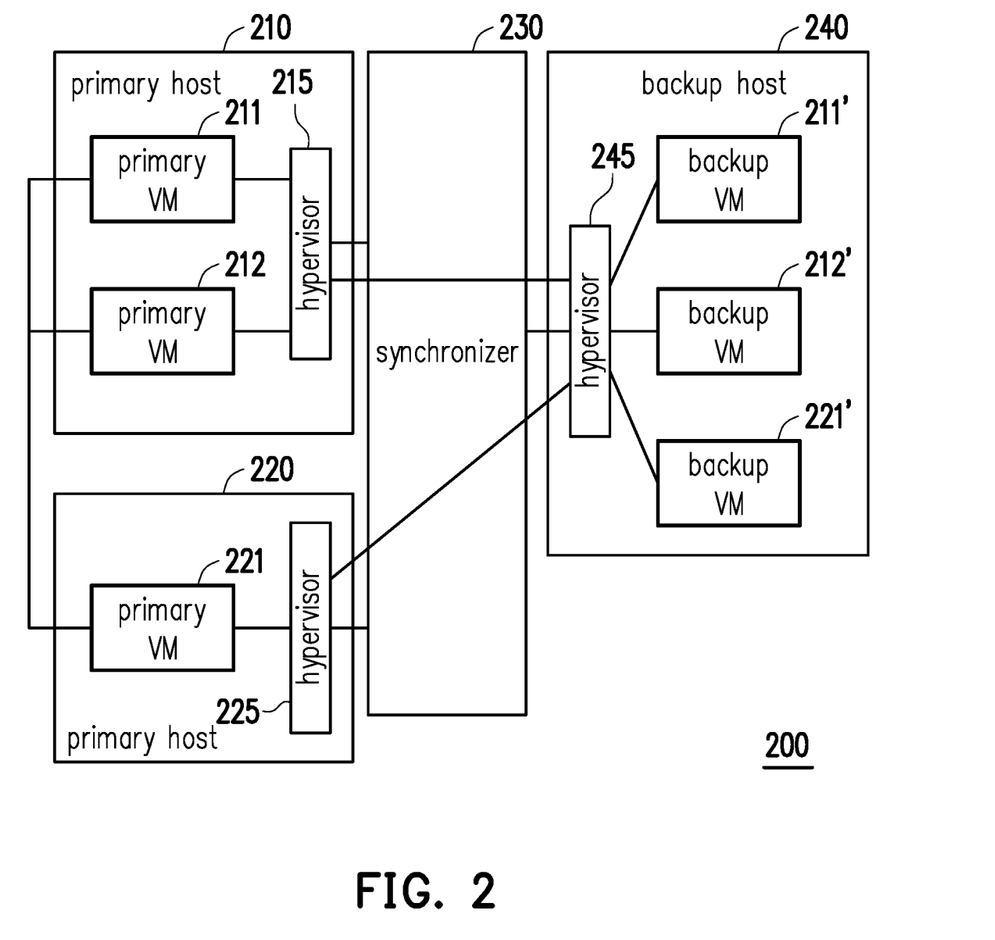
FIG. 2 illustrates a schematic diagram of a fault tolerance system for a VM group in accordance with one of the exemplary embodiments of the disclosure.

FIG. 2 illustrates a schematic diagram of a fault tolerance system for a VM group in accordance with one of the exemplary embodiments of the disclosure. All components of the fault tolerance system and their configurations are first introduced in FIG. 2. The functionalities of all possible exemplary embodiments are disclosed in more detail in conjunction with flowcharts and/or block diagrams provided later on.

Referring to an exemplary embodiment of FIG. 2, for illustrative purposes, a fault tolerance system 200 for a VM group in accordance with the disclosure would include a primary host 210, a primary host 220, a synchronizer 230, and a backup host 20, wherein the synchronizer 230 is connected to the primary host 210, the primary host 220, and the backup host 240. The primary host 210 would include a virtual machine hypervisor 215, and the primary host 220 would also include a virtual machine hypervisor 225, and the backup host 240 would include a virtual machine hypervisor 245. The virtual machine hypervisors 215 and 225 are connected to the virtual machine hypervisor 245, and the virtual machine hypervisor 215, 225 and 245 are also connected to the synchronizer 230.

The primary host 210, the primary host 220, and the backup host 240 may be any physical electronic apparatus that can served as a server computer and include a processor, a data storage device, and a communication interface. As known per se, the processor would be configured to control the operation of each host and may be, for example, a central processing unit, or other programmable devices for general purpose or special purpose such as a microprocessor and a digital signal processor, a programmable controller, an application specific integrated circuit, a programmable logic device, an application processor, other similar devices, a combination of above-mentioned devices or integrated circuits, and yet the disclosure is not limited herein. The data storage device would be configured to store, for example, temporary data, buffered data, permanent data, and compiled codes to execute features of each host and may be any form of non-transitory, volatile, non-volatile memories, and yet the disclosure is not limited herein. The communication interface would be configured to receive and transmit data to the synchronizer 230 and may support any wireless or wired transmission interface, and yet the disclosure is not limited herein. In the present exemplary embodiment, the primary host 210 would run the primary VMs 211 and 212, and primary host 220 would run the primary VM 221. The backup host 240 would run backup VMs 211' 212' and 221' receptively corresponding to the primary VMs 211, 212, and 221. In an exemplary embodiment, when there exists dataflow between the executing programs between the primary VM 212 and the primary VM 221, then the primary VM 212 and the primary VM 221 would be included in a same fault tolerance group. For example, the primary VMs 212, 212, 221 may be a webpage VM, a logic VM, a database VM, or other VMs, and yet the disclosure is not limited herein.

The synchronizer 230 may be any physical electronic apparatus that includes a processor, a data storage device, and a communication interface and may be connected to the primary host 210 and 220 as well as the backup host 240 through the communication interface. The synchronizer 230 may send out a notification to monitor and/or control states and/or operations of the VMs on all hosts by informing the virtual machine hypervisor run on each of the primary hosts 210 and 220 as well as the backup host 240.

It should be noted that, the fault tolerance system 200 for a VM group in the present exemplary embodiment would be merely for illustrative purposes, and yet the disclosure is not limited thereby. In other exemplary embodiments, the number of hosts in a fault tolerance system may be one, three or more, and each host may run one or more primary VM. Moreover, the number of backup hosts may be more than two.

In order to allow synchronization of all primary VMs in a same group during fault tolerance backups and/or failovers, the synchronizer 230 would manage fault tolerance states of all the primary VMs and control to establish fault tolerance connections of all the primary VMs in a group for fault tolerance backup. The synchronizer 230 would inform the virtual machine hypervisors 215, 225, and 245 to perform fault tolerance connections, where the details thereof would be omitted herein for brevity purposes. In accordance with an exemplary embodiment of the disclosure, the synchronizer 230 would control an output result among each of the primary VMs 211, 212, and 221 in the fault tolerance group to be outputted before the flush out stage and would start establishing a fault tolerance connection between each group member and the corresponding fault tolerance backup end so as to copy, for example, current system states of the primary VMs 211, 212, and 221 to the corresponding backup VMs 211' 212' and 221' on the backup end. Once confirming that all the group members have established fault tolerance connections, the synchronizer 230 would inform the group members to start performing synchronized snapshots. After the first synchronized snapshots are completed, the primary VMs 211, 212, and 221 would be allowed to run until next synchronized snapshots.

Figure 3:
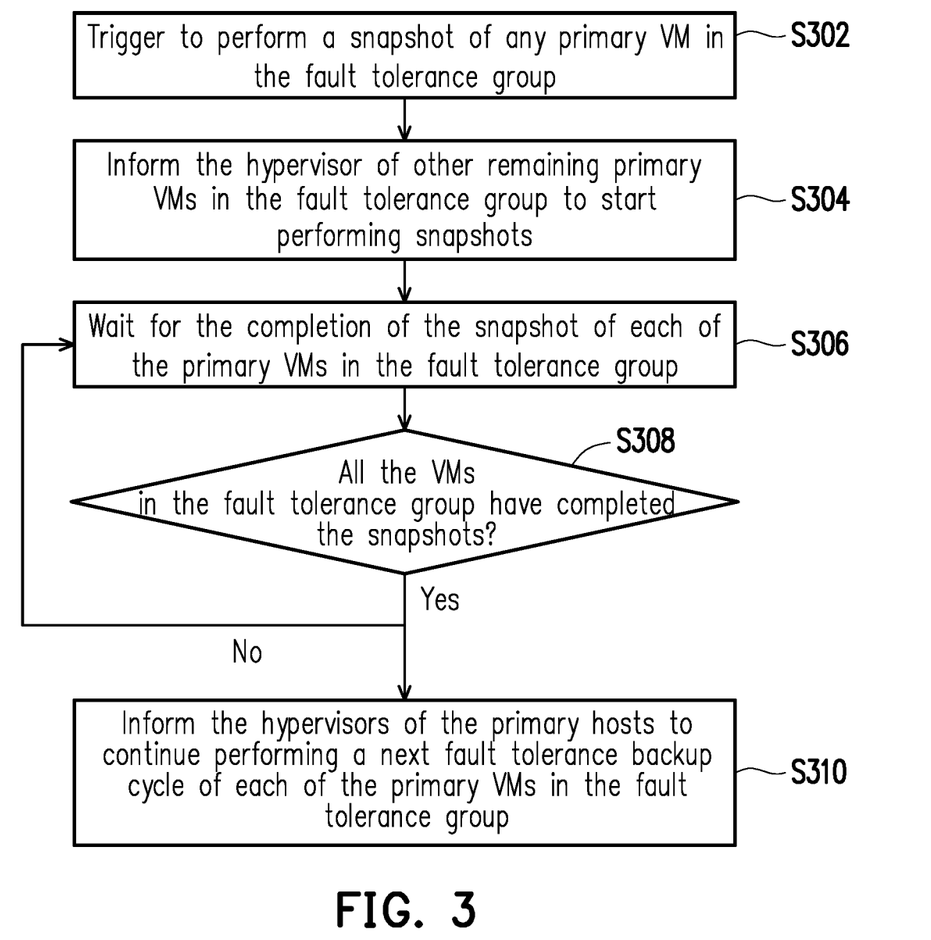
FIG. 3 illustrates a flowchart of synchronized snapshots in accordance with one of the exemplary embodiments of the disclosure.

FIG. 3 illustrates a flowchart of synchronized snapshots in accordance with one of the exemplary embodiments of the disclosure. The steps of the exemplary embodiment in FIG. 3 could be implemented by the fault tolerance system 200 for a VM group as illustrated in FIG. 2. In the following descriptions, assume that the primary VMs 211, 212, and 221 are group members of a same fault tolerance group, and the synchronizer 230 would monitor statuses of all the members in the fault tolerance group.

Referring to both FIG. 2 and FIG. 3, in one exemplary embodiment, when a snapshot of any primary VM in the fault tolerance group has been triggered to be performed (Step S302), the synchronizer 230 would inform the virtual machine hypervisor of one or more other remaining primary VMs other than the aforesaid the any primary VM in the fault tolerance group to start performing snapshots (Step S304). The synchronizer 230 would wait for the completion of the snapshot of each of the primary VMs in the fault tolerance group and determine whether all the VMs in the fault tolerance group have completed the snapshots (Step S308). If no, the synchronizer 230 would continue waiting for the completion of the snapshot of each of the primary VMs in the fault tolerance group. If yes, the synchronizer 230 would inform the virtual machine hypervisors of the primary hosts to continue performing a next fault tolerance backup cycle of each of the primary VMs in the fault tolerance group (Step S310) and collect dirty pages at the same time. Accordingly, the synchronization of fault tolerance backup among all the group members in the fault tolerance group would be ensured.

When the synchronizer 230 detects a failure of any primary host and failover is then performed on such primary host, the synchronizer 230 would inform the virtual machine hypervisor 245 to start up the corresponding backup VM, and the corresponding back VM would start from the current backup status and the failover VM would be removed from the fault tolerance group by the synchronizer 230. Assume that a new fault tolerance connection is attempted to be established, the synchronizer 230 would inform a virtual machine hypervisor of a new backup host to start up a new backup host, and the original backup host would be a new primary host connected to the new backup host. Once a state of the new primary VM (i.e. the original backup VM) and a state of the new backup VM are synchronized, the new fault tolerance backup connection has been thus completed.

Figure 4:
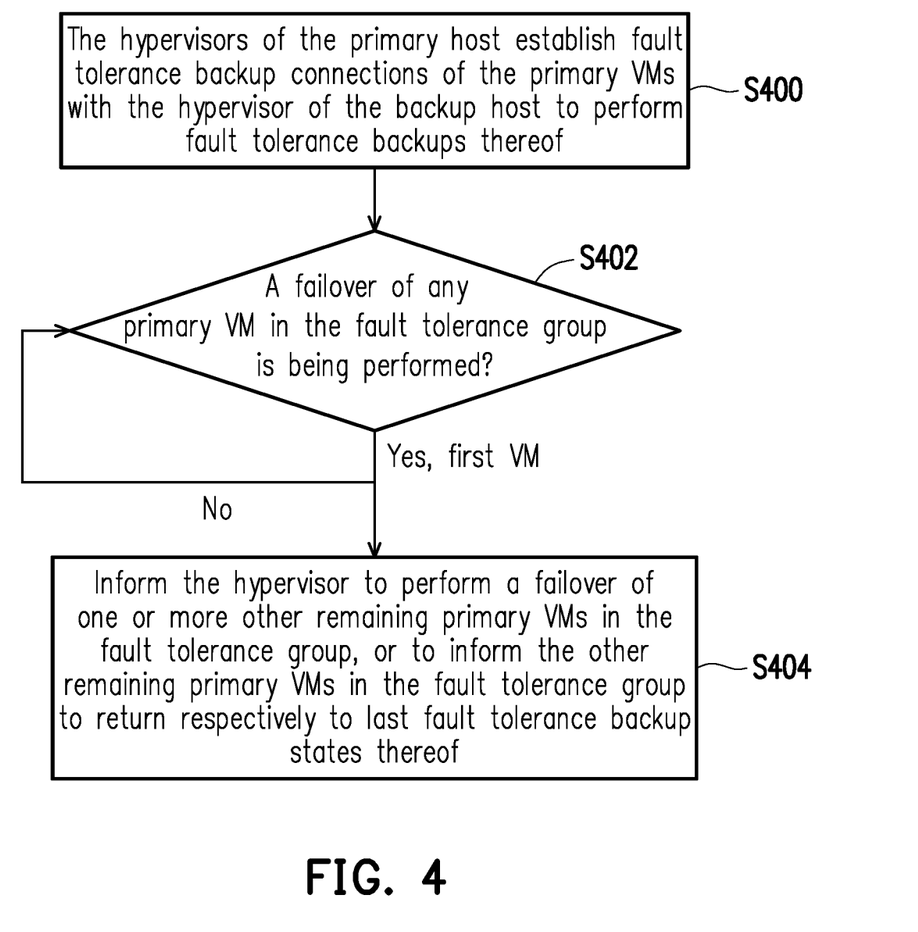
FIG. 4 illustrates a flowchart of a fault tolerance method for a VM group in accordance with an exemplary embodiment of the disclosure.

Next, FIG. 4 illustrates a flowchart of a fault tolerance method for a VM group in accordance with an exemplary embodiment of the disclosure, and the steps of the exemplary embodiment in FIG. 4 could also be implemented by the fault tolerance system 200 for a VM group as illustrated in FIG. 2.

Referring to both the exemplary embodiments of FIG. 2 and FIG. 4, assume that the primary VMs 211, 212, and 221 are group members of a same fault tolerance group. The virtual machine hypervisors 215 and 225 of the primary host 210 and 220 would establish fault tolerance backup connections of the primary VMs 211, 212, and 221 with the virtual machine hypervisor 245 of the backup host to perform fault tolerance backups thereof (Step S400). The synchronizer 230 would monitor states of all the members in the fault tolerance group to determine whether a failover of any primary VM in the fault tolerance group is being performed (Step S402). For example, when any primary host causes a failure of one or more primary VMs running thereon due to hardware failures, software errors, or power failures, failover of the primary VMs would be performed. In an exemplary embodiment, the synchronizer 230 would determine whether any of the primary VMs in the fault tolerance group does not respond to an informing of the snapshot within a time limit to accordingly determine whether a failover of any of the VMs is being performed. In other exemplary embodiments, the synchronizer 230 may determine whether the primary host 210 and 220 still provide services through other activity signals to accordingly determine whether a failover is performed on the primary VM corresponding to the service due to a failure of the primary host that such primary VM runs on. The disclosure is not limited herein.

When determining that a failover of at least one primary VM is being performed (the machine that performs failover is referred to as "a first VM"), the synchronizer 230 would inform the virtual machine hypervisor to perform a failover of one or more other remaining primary VMs in the fault tolerance group, or to return the other remaining primary VMs in the fault tolerance group back to a last fault tolerance backup state of each and continue performing fault tolerance backups of the other remaining primary VMs (Step S404). The reason behind is that, the first VM would remain in its last fault tolerance backup state during failover, and the states of the other remaining primary VMs would be synchronized with that of the first VM. After the other remaining primary VMs return back to a last fault tolerance backup state of each, several possible follow-up exemplary embodiments would be illustrated hereafter.

Figure 5:
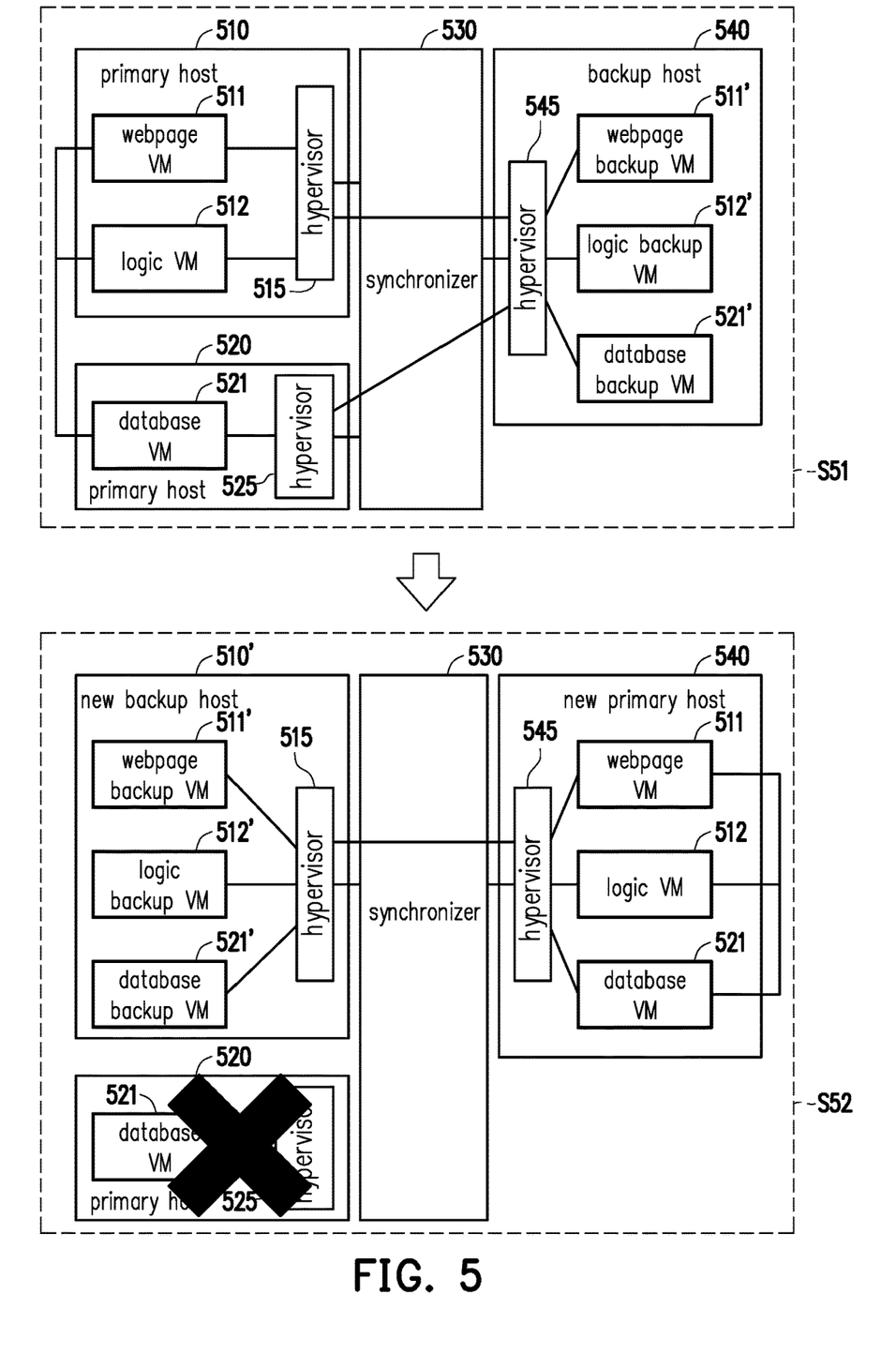
FIG. 5 illustrates schematic state diagrams of a fault tolerance mechanism for a VM group in accordance with an exemplary embodiment of the disclosure.

FIG. 5 illustrates schematic state diagrams of a fault tolerance mechanism for a VM group in accordance with an exemplary embodiment of the disclosure.

Referring to the exemplary embodiment of FIG. 5, in state S51, a primary host 510 would run a webpage VM 511 and a logic VM 512, and a primary host 520 would run a database VM 521. The backup host 540 would run a webpage backup VM 511', a logic backup VM 512' and a database backup VM 521'. A synchronizer 530 would be connected to the primary host 510, the primary host 520, and the backup host 540. The primary host 510 would include a virtual machine hypervisor 515, and the primary host 520 would include a virtual machine hypervisor 525, and the backup host 540 would include a virtual machine hypervisor 545. The virtual machine hypervisors 515 and 525 would be connected to the virtual machine hypervisor 545, and the virtual machine hypervisors 515, 525, and 545 would be connected to the synchronizer 530. The descriptions of the primary host 510, the primary host 520, the synchronizer 530, the backup host 540 as well as the virtual machine hypervisors 515, 525, and 545 may refer to those of the primary host 210, the primary host 220, the synchronizer 230, the backup host 240 as well as the virtual machine hypervisors 215, 225, and 245 and would not be repeated herein for brevity. For example, when an error occurs in the primary host 520 and thereby causing an error on the database VM 521, the virtual machine hypervisor 525 would perform a failover of the database VM 521. In an exemplary embodiment, the synchronizer 530 may start up the fault tolerance mechanism of the VM group (i.e. enter state S52) when the database VM 521 does not respond to the informing of the synchronized snapshot within a time limit.

In state S52, all members in the fault tolerance group would perform a failover to prevent from inconsistent system states after reconstruction, and fault tolerance backup connections of the VM group would be reconstructed thereafter to perform fault tolerance backup. That is, the webpage VM 511, the logic VM 512, and the database VM 521 would be failover to the backup host 540, and the backup host 540 would be a new primary host.

The fault tolerance mechanism in the exemplary embodiment of FIG. 5 would reduce extra delay accumulation generated due to a fault tolerance mechanism in the existing multi-layer network architecture. However, when a failover of any group member in a fault tolerance group in a fault tolerance system is performed due to failure, failovers of all other group members in the fault tolerance group are performed as well to prevent inconsistent system states after reconstruction and results in significant amount of time and network bandwidth expenses. In another exemplary embodiment, failover would only be performed on a primary VM having errors to further reduce the reconstruction time of the fault tolerance group in the system.

Figure 6:
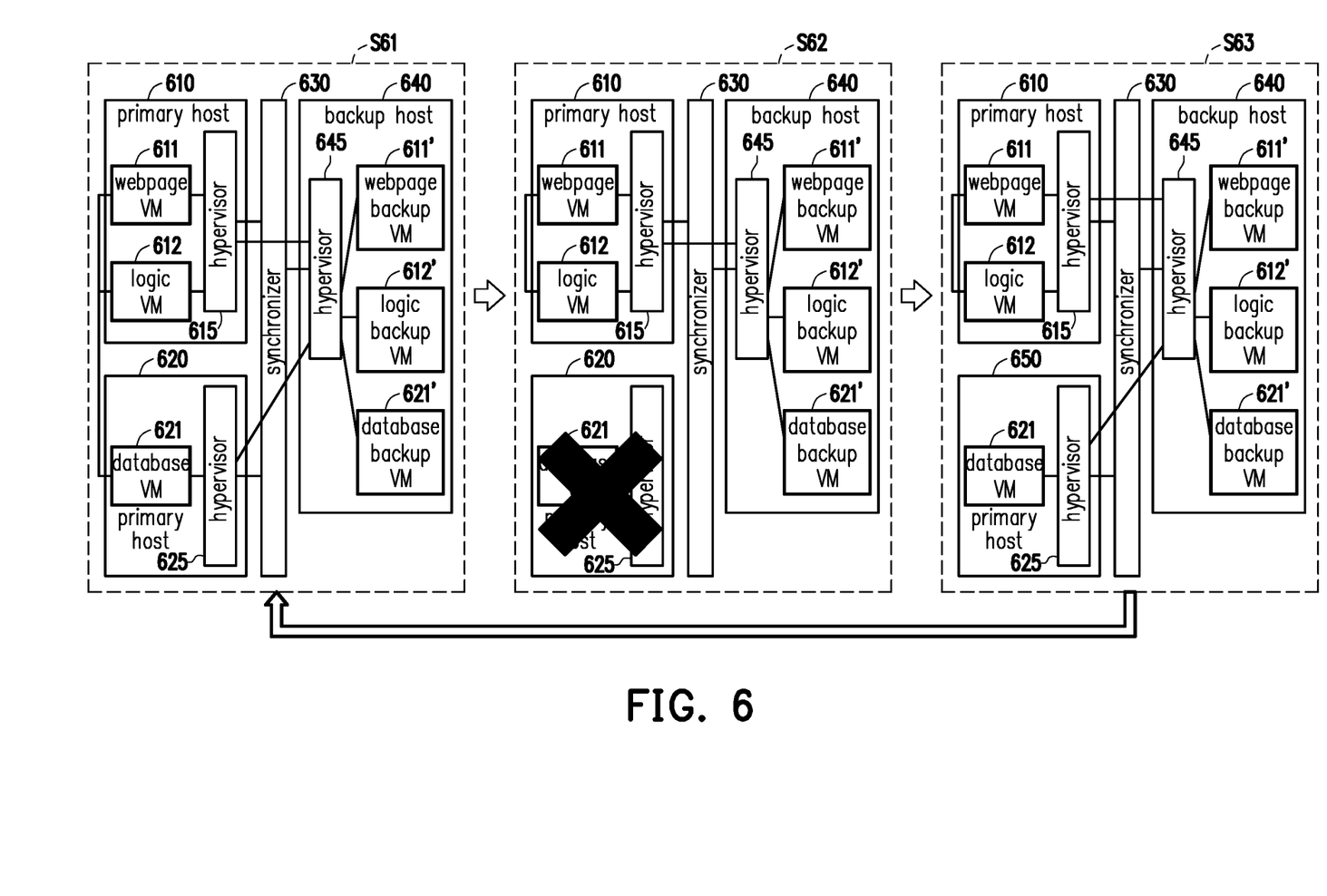
FIG. 6 illustrates schematic state diagrams of a fault tolerance mechanism for a VM group in accordance with another exemplary embodiment of the disclosure.

FIG. 6 illustrates schematic state diagrams of a fault tolerance mechanism for a VM group in accordance with another exemplary embodiment of the disclosure.

Referring to FIG. 6, in state S61, a primary host 610 would run a webpage VM 611 and a logic VM 612, and a primary host 620 would run a database VM 621. The backup host 640 would run a webpage backup VM 611', a logic backup VM 612' and a database backup VM 621'. A synchronizer 630 would be connected to the primary host 610, the primary host 620, and the backup host 640. The primary host 610 would include a virtual machine hypervisor 615, and the primary host 620 would include a virtual machine hypervisor 625, and the backup host 640 would include a virtual machine hypervisor 645. The virtual machine hypervisors 615 and 625 would be connected to the virtual machine hypervisor 645, and the virtual machine hypervisors 615, 625, and 645 would be connected to the synchronizer 630. The descriptions of the primary host 610, the primary host 620, the synchronizer 630, the backup host 640 as well as the virtual machine hypervisors 615, 625, and 645 may refer to those of the primary host 210, the primary host 220, the synchronizer 230, the backup host 240 as well as the virtual machine hypervisors 215, 225, and 245 and would not be repeated herein for brevity. Herein, when an error occurs in the primary host 620 and thereby causing an error on the database VM 621, a failover would only be performed on the database VM 621. Meanwhile, there exists no fault tolerance backup connection between the database VM 621 and the backup host 640, and the synchronizer 630 would remove the database VM 621 from the fault tolerance group.

When a failover of the database VM 621 is performed, the webpage VM 611 and the logic VM 612 would return back to a last backup state of each and stop performing their fault tolerance backups. The webpage VM 611 and logic VM 612 would stop providing services until a new fault tolerance connection of the database VM 621 is established and the database VM 621 is added to the fault tolerance group for fault tolerance backup of the fault tolerance group. The service pending time period would be a time period to reconstruct the fault tolerance connection of the database VM 621. In an exemplary embodiment, in step S62, the database VM 621 would be failover to the backup host 640, and the webpage VM 611 and the logic VM 612 would return back to a last backup state of each and continue performing their fault tolerance backup. Meanwhile, state S53 is entered.

In state S63, live migration to another primary host 650 would be performed on the database VM 621. After a fault tolerance backup link of the database VM 621 is established (i.e. the complete state of the database VM 621 has been copied to the backup host 640 and become a database backup VM 621'), the synchronizer 630 would stop performing fault tolerance backup of the webpage VM 611 and the logic VM 612 and add the database VM 621 back to the fault tolerance group. As such, failover would be only performed on the problematic database VM 621, and only the system state of the database VM 621 would be copied. Hence, the system pending time period would be a time period that the webpage VM 611 and logic VM 612 return back to a last fault tolerance backup state of each and continue performing the fault tolerance backups in addition to a time period that the database VM 621 is added to the fault tolerance group, and the reconstruction time of the fault tolerance group is reduced.

In view of the foregoing, the fault tolerance method and the fault tolerance system for a VM group proposed in the disclosure would monitor all primary VMs in a fault tolerance group through a synchronizer. When a failover of any primary VM is performed, a failover of one or more other remaining primary VMs in the fault tolerance group would be performed, or the other remaining primary VMs in the fault tolerance group would be allowed to return back to their last fault tolerance backup state of each and continue performing their fault tolerance backups. Therefore, the delay time of the workload in the VM architecture having a fault tolerance mechanism would thus be in control.

It will be clearly understood to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A fault tolerance method for a virtual machine group, applicable to a fault tolerance system, and comprising:
    establishing fault tolerance backup connections of a plurality of primary virtual machines between a virtual machine hypervisor of at least one primary host apparatus and a virtual machine hypervisor of at least one backup host apparatus to perform fault tolerance backups of the primary virtual machines, wherein the primary virtual machines are included in a fault tolerance group; and
    when a synchronizer apparatus determines that a failover of at least one first virtual machine among the primary virtual machines in the fault tolerance group is being performed,
    informing, by the synchronizer apparatus, to perform a failover of one or more other remaining primary virtual machines among the primary virtual machines in the fault tolerance group, the informing comprising:
        recording, by the synchronizer apparatus, a network card number of each of the primary virtual machines in the fault tolerance group,
        transmitting, by the synchronizer apparatus, said network card numbers to each of the primary virtual machines in the fault tolerance group, and
        controlling, by the synchronizer apparatus, an output result among each of the primary virtual machines in the fault tolerance group to be outputted before a flush out stage, or
    informing, by the synchronizer apparatus, to return the one or more other remaining primary virtual machines among the primary virtual machines in the fault tolerance group back to a last fault tolerance backup state of each and continue performing the fault tolerance backups of the other remaining primary virtual machines,
    wherein the fault tolerance system comprises the at least one primary host apparatus, the at least one backup host apparatus, and the synchronizer apparatus, wherein the synchronizer apparatus is connected to the at least one primary host apparatus and the at least one backup host apparatus, and wherein the synchronizer apparatus monitors all of the primary virtual machines in the fault tolerance group,
    wherein the at least one primary host apparatus runs the primary virtual machines, wherein the at least one backup host apparatus runs a plurality of backup virtual machines, and wherein the primary virtual machines in the fault tolerance group correspond to the backup virtual machines when performing the fault tolerance backups.

2. The fault tolerance method according to claim 1 further comprising:
    when the virtual machine hypervisor of the at least one primary host apparatus determines that an object to which the output result is transmitted corresponds to one of the network card number, controlling, by the synchronizer apparatus, the output result to be outputted before the output flush out stage.

3. The fault tolerance method according to claim 1 further comprising:
    when a snapshot of any primary virtual machine in the fault tolerance group has been performed, informing, by the synchronizer apparatus, the virtual machine hypervisor of the at least one primary host apparatus to start performing a snapshot of one or more other primary virtual machines other than the any primary virtual machine in the fault tolerance group; and
    when the snapshot of each of the primary virtual machines in the fault tolerance group has finished, informing, by the synchronizer apparatus, the virtual machine hypervisor of the at least one primary host apparatus to continue performing a next fault tolerance backup cycle of each of the primary virtual machines.

4. The fault tolerance method according to claim 3 further comprising:
    when any of the primary virtual machines in the fault tolerance group does not respond to an informing of the snapshot within a time limit, determining, by the synchronizer apparatus, whether a failover of any of the primary virtual machines is being performed accordingly.

5. The fault tolerance method according to claim 1 further comprising:
    removing, by the synchronizer apparatus, the at least one first virtual machine from the fault tolerance group.

6. The fault tolerance method according to claim 5, wherein after the failover of the at least one first virtual machine finishes, the method further comprises:
    establishing, by the synchronizer apparatus, a fault tolerance connection of the at least one first virtual machine; and
    adding, by the synchronizer apparatus, the at least one first virtual machine to the fault tolerance group.

7. The fault tolerance method according to claim 6 further comprising:
    informing, by the synchronizer apparatus, the virtual machine hypervisor of the at least one primary host apparatus to stop performing the fault tolerance backups of the other remaining one or more primary virtual machines in the fault tolerance group; and
    when the at least one first virtual machine is added to the fault tolerance group, informing, by the synchronizer apparatus, the virtual machine hypervisor of the at least one primary host apparatus to start performing the fault tolerance backups of the at least one virtual machine and each of the primary virtual machines in the fault tolerance group.

8. A fault tolerance system comprising:
    at least one primary host apparatus coupled to a memory and configured to run a plurality of primary virtual machines, wherein the primary virtual machines are included in a fault tolerance group;

at least one backup host apparatus, configured to run a plurality of backup virtual machines, wherein the primary virtual machines in the fault tolerance group correspond to the backup virtual machines when performing fault tolerance backups; and a synchronizer apparatus, connected to the at least one host apparatus and the at least one backup host apparatus, configured to monitor all of the primary virtual machines in the fault tolerance group, wherein when the synchronizer apparatus determines that a failover of at least one first virtual machine among the primary virtual machines in the fault tolerance group is being performed, the synchronizer apparatus informs one or more other remaining primary virtual machines among the primary virtual machines in the fault tolerance group to perform a failover thereof, the informing comprising the synchronizer apparatus further recording a network card number of each of the primary virtual machines in the fault tolerance group and transmitting said network card numbers to each of the primary virtual machines in the fault tolerance group, or the synchronizer apparatus informs the one or more other remaining primary virtual machines among the primary virtual machines in the fault tolerance group to return respectively to a last fault tolerance backup state thereof and continue performing the fault tolerance backups of the other remaining primary virtual machines in the fault tolerance group, and wherein a virtual machine hypervisor of the at least one primary host apparatus respectively establishes fault tolerance backup connections of a plurality of virtual machines with a virtual machine hypervisor of the at least one backup host apparatus to perform the fault tolerance backups of the primary virtual machines.

9. The fault tolerance system according to claim 8, wherein:

when the virtual machine hypervisor of the at least one primary host apparatus determines that an object to which the output result is transmitted corresponds to one of the network card number, the synchronizer apparatus controls the output result to be outputted before the output flush out stage.

10. The fault tolerance system according to claim 9, wherein:

when a snapshot of any primary virtual machine in the fault tolerance group has been performed, the synchronizer apparatus informs the virtual machine hypervisor of the at least one primary host apparatus to start performing a snapshot of one or more other primary virtual machines other than the any primary virtual machine in the fault tolerance group; and when the snapshot of each of the primary virtual machines in the fault tolerance group has finished, the synchronizer apparatus informs the virtual machine hypervisor of the at least one primary host apparatus to continue performing a next fault tolerance backup cycle of each of the primary virtual machines.

11. The fault tolerance system according to claim 10, wherein when any of the primary virtual machines in the fault tolerance group does not respond to an informing of the snapshot within a time limit, the synchronizer apparatus determines whether a failover of any of the primary virtual machines is being performed accordingly.

12. The fault tolerance system according to claim 8, wherein the synchronizer apparatus removes the at least one first virtual machine from the fault tolerance group.

13. The fault tolerance system according to claim 12, wherein after the failover of the at least one first virtual machine finishes, the synchronizer apparatus establishes a fault tolerance connection of the at least one first virtual machine and the synchronizer apparatus adds the at least one first virtual machine to the fault tolerance group.

14. The fault tolerance system according to claim 13, wherein:

the synchronizer apparatus informs the virtual machine hypervisor of the at least one primary host apparatus to stop performing the fault tolerance backups of the other remaining primary virtual machines in the fault tolerance group; and when the at least one first virtual machine is added to the fault tolerance group, the synchronizer apparatus informs the virtual machine hypervisor of the at least one primary host apparatus to start performing the fault tolerance backups of the at least one virtual machine and each of the primary virtual machines in the fault tolerance group.

* * * * *